3,414,429
METHOD OF RENDERING GLASS SURFACES ABRASION-RESISTANT AND ARTICLE PRODUCED
Howard G. Bruss, Jr., Toledo, Ohio, Walter J. Schlientz, Rome, Ga., and Bradley E. Wiens, Toledo, Ohio, assignors to Owens-Illinois, Inc., a corporation of Ohio
No Drawing. Filed Dec. 7, 1965, Ser. No. 512,239
10 Claims. (Cl. 117—69)

The instant invention relates to a process for improving the scratch resistance of glass surfaces, and particularly the exterior surfaces of glassware such as jars, bottles, tumblers and the like which are subject to abrasive contact with others in the course of manufacturing, packaging, filling and shipping. The invention further relates to improved abrasion resistant glass articles of commerce produced by the aforesaid method.

Glass derives its strength from an unblemished surface and any scratches or flaws which are present on its surface decrease its strength many fold. Generally, glass articles of commerce have their maximum strength as soon as they are formed and this strength decreases as the articles come into contact with each other, and with other surfaces.

It will be appreciated by those skilled in the art that if the glass surface is coated with a composition having good wet and dry scratch resistance or abrasive resistance properties, which by imparting said scratch resistance decrease the likelihood of breakage, more bottles can be handled by filling and packaging apparatus in the same amount of time merely by spacing the bottles closer together and increasing the speed of the conveyors, even though the glass surfaces will be subject to more contact with other surfaces. Also, since many products are packaged under pressure, for example, carbonated beverages, it is very desirable that the surface of the glass container have as few scratches as possible to minimize the possibility of breakage.

Accordingly, it is an object of the instant invention to provide an abrasion resistant coating composition which will afford sufficient protection against abrasive actions so as not to weaken the glass product.

It is a further object of this invention to provide a thin substantially transparent coating on a glass surface which coating is highly resistant to abrasion, while simultaneously substantially maintaining the strength characteristics of the glass.

Still another object of this invention is to provide a method for coating glass surfaces, such as the exterior of a glass container, so as to impart thereto scratch resisting properties, thus permitting the container to undergo normal handling, processing and shipping with the consequent rubbing of the glass surface with other surfaces without materially decreasing the strength of the container.

In attaining the objects of this invention, one feature resides in treating a glass surface with a titanium compound which is pyrolyzable, that is, chemically decomposed by the action of heat to form oxides of the metal on the glass surface while the glass surface is at a temperature above the pyrolyzing temperature of the compound, cooling the titanium-treated glass, such as in an annealing lehr, and applying to the cooled surface an alcohol sulfate. Another feature of this invention resides in treating a glass surface with a tin-containing compound which is pyrolyzable, that is, chemically decomposed by the action of heat to form oxides of the metal on the glass surface while the glass surface is at a temperature above the pyrolyzing temperature of the compound, cooling the tin-treated glass, such as in an annealing lehr, and applying to the cooled surface an alcohol sulfate.

In carrying out the instant invention, the glass article of commerce is first treated soon after the article leaves the glass-forming machine and as it is being conveyed to the annealing lehr. A solution of the pyrolyzable compound is sprayed onto the exterior surface of the glass at a temperature above the pyrolyzing temperature of the compound. The pyrolyzing temperature for titanium and tin compounds that may be used herein is between about 700° F. and 1300° F., depending, of course, upon the particular compound used, with the now preferred range being from about 900° F. to 1200° F.

The titanium compound employed in this invention is one which, upon contact with the heated surface, will react to form titanium oxide. Among the titanium compounds suitable for the purpose of this invention are volatile metallo-organic compounds such as the alkyl titanates, preferably where the alkyl group contains from 1 to 8 carbon atoms. Among the alkyl titanates that may be used are tetrabutyl titanate, tetraisopropyl titanates, tetrakis(2-ethylhexyl)titanate, tetramethyl titanate, tetraethyl titanate, tetranonyl titanate, and the like. Also included among the suitable titanium containing compounds are the titanium tetrahalides and particularly titanium tetrachloride. The ammonium salts of titanium lactate are also suitable.

The tin compounds that may be used for the purpose of the present invention include both stannous and stannic compounds. Among the suitable stannic compounds are the stannic halides and the alkyl stannic carboxylates. The stannic halides may be exemplified by stannic chloride, stannic bromide and stannic iodide. The alkyl stannic carboxylates have the general formula $(R_1)_x Sn(OOCR_2)_y$ wherein $R_1$ and $R_2$ are alkyl groups and wherein $x$ and $y$ are whole numbers from 1 to 3, the sum of which is equal to four. The alkyl groups may be branched or straight chain. The $R_2$ alkyl group preferably contains from 1 to 18 carbon atoms, such as stearate, palmitate, laurate and the like. The $R_1$ alkyl group preferably contains 1 to 8 carbon atoms such as methyl, propyl, butyl, isopropyl, isobutyl, hexyl, octyl, and the like. Included among the compounds coming within the scope of the foregoing are butyl tin acetate, dipropyl tin diacetate, dioctyl tin diacetate, dibutyl tin distearate, dibutyl tin dipalmitate, dibuyltin dilaurate, dibutyl tin maleate and the like.

Among the stannous tin compounds suitable for the purpose of this invention are the stannous dihalides such as stannous chloride, stannous bromide, stannous iodide and the carboxylic acid salts of stannous tin. The latter include compounds having the formula $Sn(OOCR)_2$ wherein R is an aliphatic or aromatic group. Included among the aliphatic groups are the alkyls, both substituted and unsubstituted having up to 18 carbon atoms. The aromatic groups include the cyclic carboxylic acids wherein the aryl is benzyl, phenyl, naphthyl or the like. The carboxylic acid salts suitable for the purpose of this invention include stannous oleate, stannous palmitate, stannous stearate, stannous caproate, stannous laurate, stannous naphthenate, stannous tartrate, stannous gluconate, stannous acetate and the like. It is understood that any titanium or tin compound may be used, provided it is capable of forming an oxide on the glass surface at the reaction temperature indicated.

The titanium or tin containing compound which is employed for the purpose of the present invention is one which, upon contact with the heated glass surface, will react to form a susbtantially colorless, transparent layer or coating of an oxide of the metal, primarily $TiO_2$ or $SnO_2$, on the glass surface. The oxide layer is tightly adhered to the surface of the glass and is believed to leave an average thickness of up to about one micron, preferably less than one micron.

As the glass article, now coated with a thin oxide layer, enters the annealing lehr, they are progressively cooled over a period of time to about 450° F. and lower, where they are sprayed with a second coating of an alcohol sulfate. It has been found that the salts of alcohol sulfates may be used for this coat. The aliphatic alcohol portion of the alcohol sulfate may contain from eight to eighteen carbon atoms. The salts may be formed with positive ions such as sodium, potassium, ammonium, and the like. Among the salts of alcohol sulfates that may be used to produce a scratch resistance value which results in unexpected and superior properties are sodium octyl sulfate, sodium nonyl sulfate, sodium myristyl sulfate, sodium cetyl-sulfate, sodium stearyl sulfate and mixtures thereof. These compounds are marketed under various names, such as "Avitex" SF for sodium cetylsulfate, "Duponal" WA for sodium lauryl sulfate, and "Duponal" LS for sodium oleyl sulfate, "Avitex" C for mixtures of cetyl and stearyl, "Avitex" ML for the long chain quaternary amine derivatives and "Avitex" AD for sulfated alcohol derivatives. "Avitex" SF, C, ML, and AD, and "Duponal" WA and LS are the trademarks of E. I. du Pont de Nemours and Company.

The organic coating composition can be applied by any suitable means such as a traversing spray nozzle at varying rates such as about 1 pint to about 1 quart of the organic coating per 100 square feet of the lehr belt. Desirably, the spray is done near the cold end of the lehr when the glassware is in a temperature range of about 100 to 450° F.

The above objects, features, advantages, and examples are not to be construed as limiting the instant invention as these and other features will become apparent to those skilled in the art. The following examples are merely illustrative of the present invention and should not be considered limiting its scope in any way.

EXAMPLE I

A tetraisopropyl titanate solution consisting of one part by volume of titanate and one part by volume of anhydrous isopropyl alcohol was prepared by dissolving the titanate at room temperature in the solvent. The solution obtained was sprayed onto the exterior surface of glass bottles at the rate of 0.5 gallon per hour as they were being conveyed from the bottle forming machine to the annealing lehr. The surface temperature was about 1100° F. and the titanate pyrolyzed almost immediately.

EXAMPLE II

An emulsion of sodium salts of higher fatty alcohol sulfates was prepared by adding to 995 milliliters of deionized water with constant stirring 5 grams of "Avitex" C, manufactured by E. I. du Pont de Nemours and Company. "Avitex" C is a mixture of sodium alkyl sulfates; the alkyl portion is derived from cetyl and stearyl alcohols. The mixture is soluble in water and readily emulsifies. The emulsion was sprayed onto bottles at the rate of 1–2 gallons per hour. The temperature of the bottles was about 300° F.

EXAMPLE III

A number of bottles coated with the composition of Example I were coated with the emulsion of Example II.

EXAMPLE IV

A 20% solution of stannous chloride was prepared by adding the chloride to 100 milliliters of acidified water. The water was previously acidified by the addition of 5 milliliters of hydrochloric acid. The acidified 20% $SnCl_2$ was sprayed onto bottles, using a spray nozzle, at the rate of 500 ml. per hour (0.13 g.p.h.) at the hot end.

EXAMPLE V

Bottles, treated with the stannous chloride preparation of Example IV were sprayed with a 0.5% solution of "Avitex" C at the rate of about 1.5 gallons per hour at the cold end of the lehr where the temperature was about 300 to 350° F.

EXAMPLE VI

Stannic chloride was applied to the exterior surface of freshly formed glass containers as they were continuously being conveyed from the bottle forming machine to the annealing lehr. Dry air was bubbled through the liquid stannic chloride and this air stream, rich in stannic chloride, was directed to the transfer belt between the annealing lehr and the forming machine. A metal enclosure was placed over the transfer belt in order to confine the stannic chloride and air mixture in the vicinity of the freshly formed bottles. The temperature of the surface of the glass was about 1100° F., and the stannic chloride was pyrolyzed almost immediately. A clear, transparent coating formed upon the surface of the bottles which was hard, but the bottles could, nevertheless, be scratched by firmly rubbing two containers against each other.

EXAMPLE VII

A number of bottles treated according to Example VI were sprayed at the cold end of the lehr with "Avitex" C. The emulsion was sprayed onto the surface of the glass when the glass surface temperature was about 300° F.

EXAMPLE VIII

A number of uncoated bottles were sprayed at the cold end of the lehr with "Avitex" C. The technique was as above described.

Uncoated bottles, bottles coated with titanium, bottles coated with tin, bottles coated with the emulsions, bottles that were coated with both the titanium and the emulsion and bottles coated with both tin and the emulsion were tested with a scratch test machine to evaluate the effectiveness of the respective coatings. The scratch test machine is designed to abrade the surface of one glass against the surface of a similar bottle. One bottle is fastened securely in the stationary lower set of chucks. The other bottle is fastened in the upper chucks which are positioned so that the axis of the bottles will be at 90° to each other. The test load is applied to the upper bottle which is driven at a constant speed of 2.8 inches per minute in a direction of 45° to the axis of either bottle. The actual rate of scratch propagation on the bottle is then two inches per minute.

By this design, a fresh surface of one bottle is always contacted with a fresh surface of the other. Since the base of each bottle extends in the direction of motion, the scratch is propagated from the shoulder to the base. This permits the detection of poor scratch protection in a particular section of the ware since identical sections of each bottle are contacted.

The force exerted by the second bottle is known, measured force, and after each pass, the bottles are examined for scratches. The force, or load, in pounds was measured with respect to the scratch resistance of the dry bottles, of bottles which were wetted with water, that is, the test machine can be filled with water and the scratch evaluation performed with the contacting surfaces submerged. These test results are reported as wet scratch protection. The scratch protection was also measured with bottles which had been subjected to a caustic wash comprising a 5% NaOH aqueous solution at a temperature of 150° F. for a period of one-half hour.

Another property that has been measured to demonstrate the characteristics of the instant invention is lubricity. Lubricity is measured by determining the angle at which the top bottle in a pyramid of three bottles on their sides will start to slide when the support is tilted. What is measured is the starting friction or the angle of repose. The tangent of the angle of repose is the coefficient of friction when motion is impending, which value is inversely related to the lubricity of the glass surface. Untreated bottles will reach an angle of 35 to 40° before sliding. A good lubricious surface will permit a dry bottle to slide at 6 to 8°. Bottles are run dry and wet, before and after caustic. The results of these tests are presented below.

TABLE I.—NUMBER OF POUNDS TO PRODUCE SCRATCH

|  | Dry | Wet | After caustic wash | |
|---|---|---|---|---|
|  |  |  | Dry | Wet |
| Uncoated bottles | 2 | 3 | 2 | 5 |
| Alcohol sulfates alone | 5 | 10 | 10 | 10 |
| Titanium alone | 2 | 2 | 7 | 4 |
| Titanium and alcohol sulfate | 100+ | 100+ | 100+ | 70 |

TABLE II.—NUMBER OF POUNDS TO PRODUCE SCRATCH

|  | Dry | Wet | After caustic wash | |
|---|---|---|---|---|
|  |  |  | Dry | Wet |
| Uncoated bottle alone | 2 | 3 | 2 | 5 |
| Alcohol sulfate alone | 10 | 5 | 10 | 10 |
| Tin (stannic) alone | 10 | 10 | 40 | 55 |
| Tin (stannous) and alcohol sulfate | 100 | 100 | 70 | 100 |
| Tin (stannic) and alcohol sulfate | 55 | 85 | 30 | 85 |

TABLE III.—ANGLE OF REPOSE

|  | Dry | Wet | After caustic wash | |
|---|---|---|---|---|
|  |  |  | Dry | Wet |
| Uncoated bottles | 35 | 40 | 40 | 40 |
| Alcohol sulfates alone | 9 | 37 | 10 | 10 |
| Titanium alone | 35 | 40 | 40 | 40 |
| Titanium and alcohol sulfate | 9 | 20 | 10 | 19 |

TABLE IV.—ANGLE OF REPOSE

|  | Dry | Wet | After caustic wash | |
|---|---|---|---|---|
|  |  |  | Dry | Wet |
| Uncoated bottles | 35 | 40 | 40 | 40 |
| Alcohol sulfate alone | 9 | 37 | 10 | 10 |
| Tin (stannic) alone | 45 | 33 | 18 | 13 |
| Tin (stannous) and alcohol sulfate | 29 | 23 | 23 | 23 |
| Tin (stannic) and alcohol sulfate | 12 | 25 | 30 | 18 |

The above results clearly demonstrate the unexpected and unobvious results produced by overcoating the first-applied coat with a coating comprising a composition salt of higher fatty alcohol sulfates.

As is evident from the above examples and discussions, it is readily apparent that excellent damage preventing coatings are imparted to glass articles of commerce by first applying thereto a coating of a compound which is capable of being pyrolyzed and then coating said coat with a salt of a higher fatty alcohol sulfate.

Obviously, many modifications and variations of the instant invention are possible in the light of the above teachings. It is therefore to be understood that within the scope of the claims, the invention may be practiced otherwise than as specifically described.

We claim:
1. A method for increasing the abrasion resistance of a glass surface which comprises treating said surface at a pyrolyzable temperature with a compound selected from the group consisting of titanium and tin which compound is pyrolyzable to form an oxide coating of the metal on said glass surface, cooling said treated surface to a temperature below 450° F. and then spraying onto said surface an emulsion containing salts of higher fatty alcohol sulfates and mixtures thereof.

2. The method according to claim 1 wherein the emulsion contains sodium stearyl sulfate.

3. The method according to claim 1 wherein the emulsion contains sodium cetyl sulfate.

4. The method according to claim 1 wherein the emulsion comprises a mixture of sodium cetyl sulfate and sodium stearyl sulfate.

5. The method according to claim 1 wherein the alcohol contains from eight to eighteen carbon atoms and wherein said salts are alkali salts of the higher fatty alcohol sulfates.

6. The method according to claim 1 wherein the titanium compound is an alkyl titanate and wherein said alkyl group contains from 1 to 8 carbon atoms.

7. The method according to claim 6 wherein the titanium compound is tetrabutyl titanate or tetraisopropyl titanate.

8. The method according to claim 1 wherein the tin is selected from the group consisting of stannous halides, stannic halides, alkyl stannic carboxylates of the formula $(R_1)_x Sn(OOCR_2)_y$, wherein $R_2$ is an alkyl group of 1 to 18 carbons, $R_1$ is an alkyl group of 1 to 8 carbons and wherein $x$ and $y$ are whole numbers of from 1 to 3, the sum of which is equal to four, and the carboxylic acid salts of stannous tin of the formula $Sn(OOCR)_2$ wherein R is an alkyl of 2 to 18 carbons.

9. The method according to claim 8 wherein the tin compound is stannic chloride.

10. An article of manufacture comprising a glass container having a thin, tightly adhering transparent substantially colorless coating on its surface, said coating consisting essentially of an undercoating of a member selected from the group consisting of titanium oxide and tin oxide, and said oxide overcoated with a member selected from the group consisting of sodium stearyl sulfate, sodium cetyl sulfate and mixtures thereof, and said article of manufacture as made with the method defined in claim 1.

References Cited

UNITED STATES PATENTS

| 2,768,909 | 10/1956 | Halsam | 117—124 |
| 3,161,537 | 12/1964 | Dettre et al. | 117—88 XR |
| 3,323,889 | 6/1967 | Carl et al. | 117—124 XR |

ALFRED L. LEAVITT, *Primary Examiner.*

W. F. CYRON, *Assistant Examiner.*